United States Patent [19]

Gotoda

[11] 4,425,989
[45] Jan. 17, 1984

[54] POWER TRANSMISSION SYSTEM FOR VEHICLES

[75] Inventor: Yusuke Gotoda, Tokyo, Japan

[73] Assignee: Honda, Giken, Kogyo, Kabushiki, Kaisha, Tokyo, Japan

[21] Appl. No.: 247,821

[22] Filed: Mar. 26, 1981

[30] Foreign Application Priority Data

Apr. 2, 1980 [JP] Japan .................................. 55-42948

[51] Int. Cl.³ ........................ F16D 47/04; F16D 7/02; B60K 5/04
[52] U.S. Cl. ................................. 192/48.92; 180/230; 464/46
[58] Field of Search ............................ 192/48.3, 48.92; 180/230; 464/46, 47

[56] References Cited

U.S. PATENT DOCUMENTS

| | | | |
|---|---|---|---|
| 3,072,234 | 1/1963 | Maurice et al. ............... | 192/48.92 X |
| 3,251,442 | 5/1966 | Aschauer ...................... | 192/48.92 X |
| 3,854,561 | 12/1974 | Conde ............................... | 192/48.92 |
| 4,331,212 | 5/1982 | Tsuboi ............................. | 180/230 |

FOREIGN PATENT DOCUMENTS 2319810 8/1975 France ............................... 192/48.92

207237 11/1923 United Kingdom ............... 192/48.3

Primary Examiner—Allan D. Herrmann
Attorney, Agent, or Firm—Posnack, Roberts, Cohen & Spiecens

[57] ABSTRACT

A power transmission system for vehicles comprising a driving member connected to an engine crankshaft, and a driven member connected to a driving wheel, the driving and driven members being connected with each other via a one-way clutch and a friction clutch which are disposed in parallel to each other. The one-way clutch is in a connected state when a forward load is applied to the engine, and in a disconnected state when a back load is applied to the engine. The friction clutch is operated to slip when it receives a torque greater than a predetermined value. With this arrangement, power is normally transmitted from the engine to the driving wheel through the one-way clutch and the friction clutch without any substantial power loss whereas a back load to be transmitted from the driving wheel to the engine in excess of a predetermined value is interrupted by the disconnection of the one-way clutch and the slipping of the friction clutch to prevent the engine from being subjected to any excessively great back load.

10 Claims, 2 Drawing Figures

4,425,989

POWER TRANSMISSION SYSTEM FOR VEHICLES

BACKGROUND OF THE INVENTION

1. Field of the Invention

This invention relates to a power transmission system for vehicles, mainly for motorcycles.

2. Description of the Prior Art

In general, a power transmission system for vehicles experiences vibration when it receives an excessively large back load due to sudden deceleration of the vehicle. For minimizing such vibration, there has been proposed a power transmission system which is provided with a damper formed of an elastic material such as rubber. However, in this known power transmission system, it is necessary to make the capacity of the elastic element sufficiently high. This causes an increase in the dimensions not only of the damper but also of the power transmission system as a whole. Moreover, the above-mentioned damper responds to load both in the forward and reverse directions, so that it causes an increase in vibration of the power transmission system when the load is varied.

SUMMARY OF THE INVENTION

An object of the present invention is to provide a power transmission which eliminates the abovementioned drawbacks encountered in the conventional power transmission systems for vehicles.

A further object of this invention is to provide a comparatively small-sized power transmission system for vehicles, capable of effectively absorbing vibration, which permits, when a forward load is applied to the engine, the transmission of power from the engine to a driving wheel without causing any decrease in the power level and which, when a back load is applied to the engine, prevents the level of the back load from being increased to a value in excess of a predetermined value, so that an excessively large back load is not applied to the engine.

To this end, the present invention provides a power transmission system for vehicles, comprising a driving member connected to the crankshaft of the engine, and a driven member connected to a driving wheel, the driving and driven members being connected to each other via a one-way clutch and a friction clutch which are disposed parallel to each other, the one-way clutch being adapted to be connected when a forward load is applied to the engine and disconnected when a back load is applied to the engine, the friction clutch being operable to slip when it receives a torque greater than a predetermined value.

The above and other objects as well as advantageous features of the invention will become apparant from the following detailed description of a preferred embodiment of the invention taken in conjunction with the accompanying drawings.

DESCRIPTION OF THE PREFERRED EMBODIMENT

A power transmission system according to the present invention which is applied to a motorcycle will be described with reference to the accompanying drawings.

Figure 1:
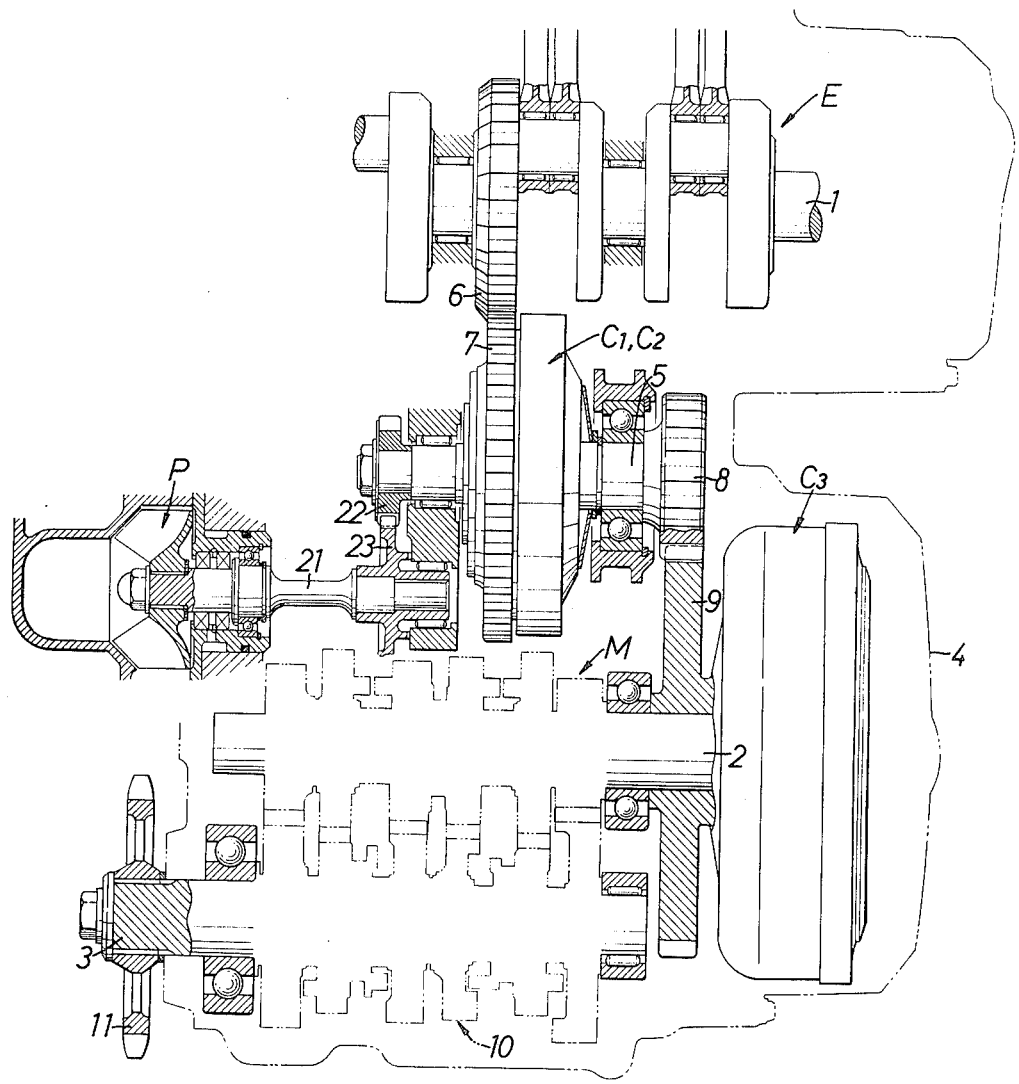
FIG. 1 is a developed plan view of a power transmission system for motorcycles embodying the present invention.

Referring to FIG. 1, an engine, generally designated at E and a speed change gear, generally designated at M, are coupled in such a manner that a crankshaft 1 of the engine and a main shaft 2 and a countershaft 3 of the speed change gear are supported in a common casing 4.

An intermediate shaft 5 is disposed between and parallel to the crankshaft 1 and the main shaft 2. A one-way clutch $C_1$ and a friction clutch $C_2$ are mounted parallel to each other on the intermediate shaft 5. An input gear 7 which is common to the clutches $C_1$, $C_2$ is also mounted on the intermediate shaft 5, which gear 7 is in mesh with an output gear 6 formed on the outer circumferential surface of a crank web of the crankshaft 1.

A gear 8 is fixedly mounted on an output end of the intermediate shaft 5, and is in mesh with an input gear 9 of a conventional manual clutch $C_3$ mounted on an input end of the main shaft 2.

A conventional change gear mechanism 10 operatively connects the main shaft 2 and the countershaft 3. A sprocket 11 is fixedly mounted on an output end of the main shaft 2, and is adapted to drive a driving wheel, i.e. a rear wheel of a motor-cycle via a chain (not shown).

Figure 2:
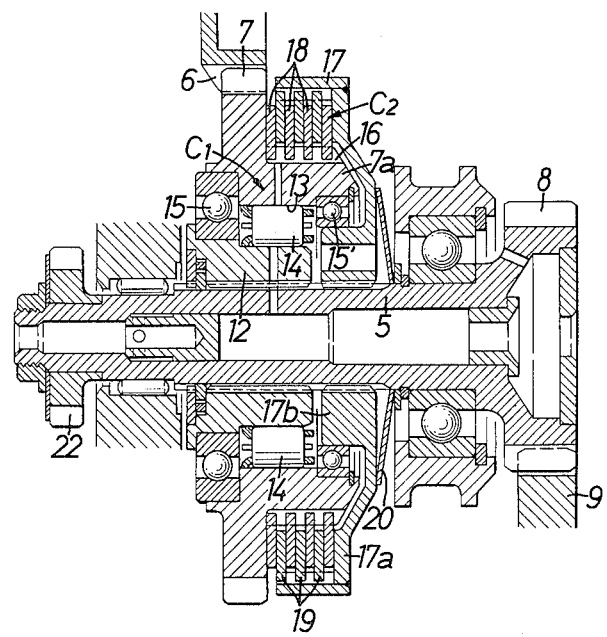
FIG. 2 is an enlarged longitudinal sectional view of an essential portion of the same.

The construction of the one-way clutch $C_1$ and friction clutch $C_2$ referred to above will be described in detail with reference to FIG. 2.

The one-way clutch $C_1$ comprises an inner clutch member 12 spline-fitted around the intermediate shaft 5, an outer clutch member 13 formed on the inner circumferential surface of a boss 7a of the input gear 7 and surrounding the inner clutch member 12, and a sprag 14 inserted between the inner and outer clutch members 12, 13. The boss 7a is rotatably supported on the inner clutch member 12 and on an outer clutch boss 17b, which will be described later, of the clutch $C_2$ via bearings 15, 15'. When the one-way clutch $C_1$ receives a forward load during operation of the engine, the inner and outer clutch members 12, 13 are connected to each other by the locking action of the sprag 14. When the one-way clutch $C_1$ receives a back load, the inner and outer clutch members 12, 13 are disconnected from each other by the sprag 14.

The friction clutch $C_2$ comprises an inner clutch member 16 formed on the outer circumferential surface of the boss 7a of the input gear 7, an outer clutch member 17 surrounding the inner clutch member 16, a plurality of driving friction plates 18 slidably spline-fitted on the inner circumferential surface of the inner clutch member 16, and a plurality of driven friction plates 19 interlaced with the driving friction plates 18 and slidably fitted in the outer circumferential surface of the outer clutch member 17. A side wall 17a of the outer clutch member 17 is opposed to a side surface of the input gear 7 with the driving and driven friction plates 18, 19 held therebetween. The side wall 17a receives on its rear surface a resilient force from a belleville spring 20 to press the friction plates 18, 19 against each other. Accordingly, a frictional binding force, or a slip torque, of the friction plates 18, 19 is determined by a set load of the belleville spring 20 acting against the side wall 17a.

The outer clutch member 17 has a boss 17b in the central portion of the side wall 17a thereof. The boss 17b is slidably spline-fitted on the intermediate shaft 5 so as not to prevent the side wall 17a from pressing against the friction plates 18, 19.

In the embodiment shown in FIG. 1 of the drawings, a drive shaft 21 for an engine-cooling water supply pump P is disposed in a space between the intermediate shaft 5 and the main shaft 2. The drive shaft 21 is driven by the intermediate shaft 5 via gears 22, 23 which are in mesh with each other. In this arrangement, a light load from the pump P constantly acts on the intermediate shaft 5 so that vibrations of the intermediate shaft 5 can be effectively prevented.

The operation of this embodiment will be described hereafter.

When a forward load is applied to the engine E, an output torque from the crankshaft 1 is transmitted to the input gear 7 via the output gear 6 and thence to the one-way clutch $C_1$ and friction clutch $C_2$. Since the one-way clutch $C_1$ is in a connected state when a forward load is applied to the engine E, the torque distributed to the clutch $C_1$ is transmitted to the intermediate shaft 5 via the outer clutch member 13, sprag 14 and inner clutch member 12. On the other hand, the torque distributed to the friction clutch $C_2$ is also transmitted to the intermediate shaft 5 via the inner clutch member 16, drive friction plates 18, driven friction plates 19 and outer clutch member 17. Even when the output torque from the crankshaft 1 exceeds the predetermined slip torque for the friction clutch $C_2$, the entire excess torque is transmitted to the intermediate shaft 5 by the one-way clutch $C_1$, so that no slip occurs in the friction clutch $C_2$. Accordingly, the output torque from the crankshaft 1 is transmitted to the intermediate shaft 5 efficiently. The torque is then transmitted to the driving sprocket 11 via the gears 8, 9, manual clutch $C_3$ and speed change gear M to drive the rear wheel (not shown).

When a back load is applied to the engine E, or, for example, when the vehicle is shifted from a high-speed running condition to a decelerated running condition, a drive torque applied from the road surface to the rear wheel is transmitted to the crankshaft 1 in reverse through the above-mentioned power conduction path. In this case, the intermediate shaft 5 acts as the driving side with respect to the input gear 7, so that the one-way clutch $C_1$ is in a disconnected state. Consequently, the driving torque from the rear wheel is transmitted from the intermediate shaft 5 to the input gear 9 via the friction clutch $C_2$ only. When the reverse driving torque exceeds the predetermined slip torque for the friction clutch $C_2$, a slip occurs between the friction plates 18 and 19. Thus, back load transmitted to the engine E can be kept to a value less than a predetermined level.

In the above embodiment of the present invention, the input gear 7 constitutes a driving member, and the intermediate shaft 5 a driven member.

According to the present invention, as described above, a driving member and a driven member provided in a power conduction path extending from a crankshaft in an engine to the driving wheel are connected together via a one-way clutch and the friction clutch which are disposed parallel to each other. The one-way clutch is constructed in such a manner that it is in connected state when a forward load is applied to the engine and disconnected when a back load is applied to the engine. The friction clutch is so constructed that slip occurs therein when it receives a torque exceeding a predetermined level. Accordingly, power from the engine is normally transmitted to the driving wheel via the one-way clutch and the friction clutch without causing any substantial power loss, so that a high transmission efficiency can be obtained. The one-way clutch and the friction clutch cooperate to share the load so that the usable lives thereof can be increased and the capacities of these clutches can be reduced to minimize the dimensions of the power transmission system as a whole. When an excessively large back load is applied to the engine, it can be limited to a value less than a predetermined level due to the slipping operation of the friction clutch to effectively decrease the resulting vibration of the power transmission system, thus providing a comfortable ride.

The present invention is not, of course, limited to the above-described embodiment; it may be modified in various ways within the scope of the appended claims.

What is claimed is:

1. A power transmission for a vehicle having an engine with a crankshaft and a driving wheel, said power transmission comprising a power transmission system, a clutch, a pair of reduction gears in mesh with each other and drivingly connecting said power transmission system and said clutch, a speed change gear device connecting said clutch to the driving wheel, said transmission system being interposed between the crankshaft of the engine and said clutch and comprising a driving member for connection to the engine crankshaft, a driven member for connection to the clutch through the pair of reduction gears, and means operatively connecting said driving and driven members together including a one-way clutch means and a friction clutch means, said one-way clutch means being operative to connect said driving and driven members when a forward load is applied to the engine and being inoperative to disconnect said members when a back load is applied to the engine, said friction clutch means being operable to undergo slipping when it receives a torque greater than a predetermined level.

2. A power transmission system for a vehicle as claimed in claim 1 wherein said one-way clutch means and said friction clutch means are connected in parallel such that forward load from the driving member to the driven member is transmitted through said one-way clutch means and said friction clutch means acting in concert whereas back load from the driven member to the driving member is transmitted solely through the friction clutch means.

3. A power transmission system for a vehicle as claimed in claim 2 wherein said friction clutch means includes friction members arranged in relation to said one-way clutch means to transmit forward load up to the limit of slipping of the friction clutch means, excess forward load being transmitted through the operative one-way clutch means, whereas for back load only a value up to the limit of slipping is transmitted through the friction clutch means, the one-way clutch means then being inoperative.

4. A power transmission system for a vehicle as claimed in claim 1 wherein said driving member comprises an input gear mounted on said driven member, said input gear being a common drive means for said one-way clutch means and said friction clutch means.

5. A power transmission system for a vehicle as claimed in claim 4 wherein said input gear includes a boss, said one-way clutch means comprising an inner clutch member extending around said driven member, an outer clutch member surrounding said inner clutch member, said boss having an inner circumferential portion on which said outer clutch member is formed and a sprag between said inner and outer clutch members.

6. A power transmission system for a vehicle as claimed in claim 4 or 5 wherein said friction clutch means comprises an inner clutch member, said boss of said input gear having a circumferential portion on which said inner clutch member of said friction clutch means is formed, said friction clutch means further comprising an outer clutch member mounted on said driven member and surrounding said inner clutch member, a plurality of driving friction plates on said inner clutch member, a plurality of driven friction plates on said outer clutch member and interlaced with said driving friction plates, and means for urging said driving and driven friction plates into frictional engagement with one another.

7. A power transmission system for a vehicle as claimed in claim 6 wherein said means for urging said driving and driven friction plates into frictional engagement with one another comprises a spring.

8. A power transmission system for a vehicle as claimed in claim 1 wherein said speed change gear is interposed between said driven member and said driving wheel.

9. A power transmission system for a vehicle as claimed in claim 1 wherein said input gear includes a boss, said one-way clutch means comprising an inner clutch member extending around said driven member, an outer clutch member surrounding said inner clutch member, said boss having an inner circumferential portion on which said outer clutch member is formed and a sprag between said inner and outer clutch members, said friction clutch means comprising an outer clutch member mounted on said driven member and surrounding said inner clutch member, a plurality of driving friction plates on said inner clutch member, a plurality of driven friction plates on said outer clutch member and interlaced with said driving friction plates, and means for urging said driving and driven friction plates into frictional engagement with one another, and bearing means supporting said input gear on said inner clutch member of said one-way clutch means and on said outer clutch member of said friction means.

10. A power transmission system for a vehicle as claimed in claim 1 wherein said friction clutch means and said one-way clutch means are arranged parallel to one another.

* * * * *